B. B. DAWSON.
TIRE.
APPLICATION FILED MAR. 3, 1910.
974,861.
Patented Nov. 8, 1910.
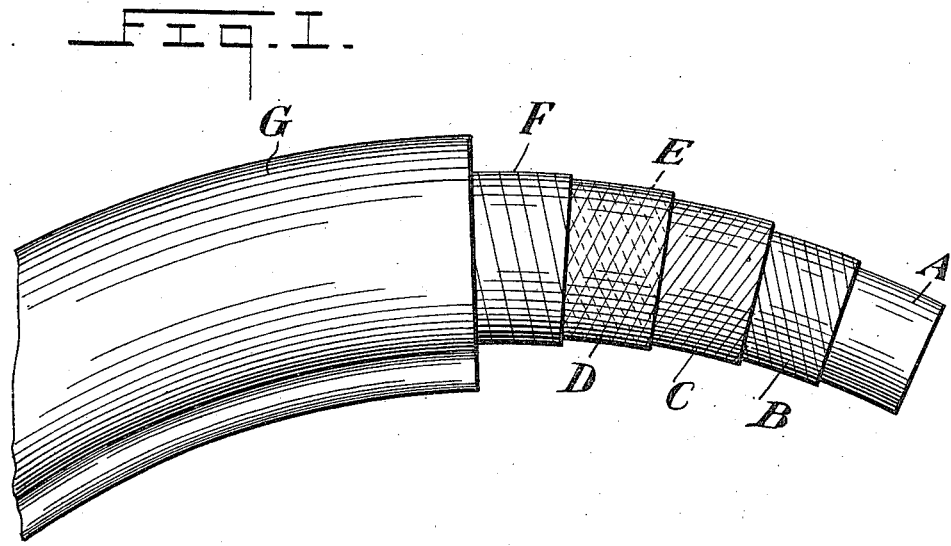
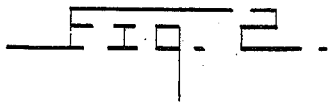
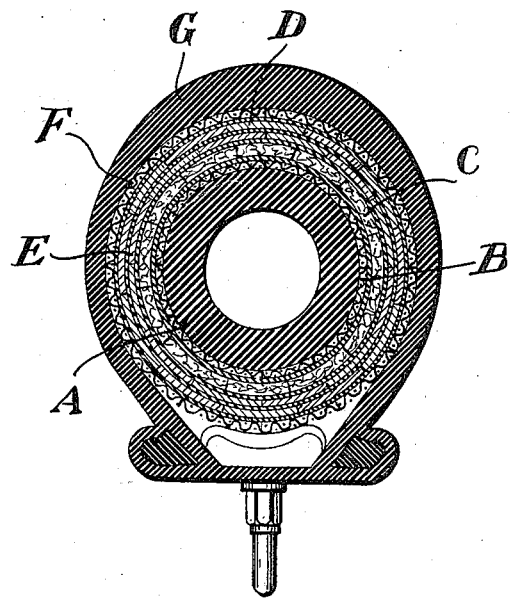
Witnesses
E. E. Johansen
M. L. Lowry
Inventor
Bailey Bradley Dawson.
By Woodward & Chandlee
Attorney
THE NORRIS PETERS CO., WASHINGTON, D. C.

UNITED STATES PATENT OFFICE.

BAILEY BRADLEY DAWSON, OF LODGE, VIRGINIA.

TIRE.

974,861. Specification of Letters Patent. Patented Nov. 8, 1910.

Application filed March 3, 1910. Serial No. 547,015.

*To all whom it may concern:*

Be it known that I, BAILEY BRADLEY DAWSON, a citizen of the United States, residing at Lodge, in the county of Northumberland and State of Virginia, have invented certain new and useful Improvements in Tires, of which the following is a specification.

This invention relates to vehicle tires and more particularly to pneumatic tires, and has for its object to provide a pneumatic tire of a structure designed to prevent puncture thereof and yet give a proper resilience to secure sufficient traction.

Other objects and advantages will be apparent from the following description, and it will be understood that changes in the specific structure shown and described may be made within the scope of the claim without departing from the spirit of the invention.

In the drawings forming a portion of this specification, and in which like numerals of reference indicate similar parts of the several views, Figure 1 is a view of the present tire, the succeeding layers thereof being shown extended one beyond the other to illustrate their character. Fig. 2 is a transverse section.

Referring now to the drawings, the present tire includes an interior tube A of rubber arranged to receive the air, and surrounded by a wrapping formed of a strip of canvas B. This strip of canvas is treated exteriorly with a thin coating of uncured rubber, and there is then disposed thereupon an oppositely wrapped strip of sea island cotton indicated at C. Disposed about this wrapping of cotton there is an oppositely wrapped layer formed of parallel strips of rawhide E, and upon these strips of rawhide there is disposed a wrapping of parallel strips of rawhide D, extending in the opposite direction. About this second layer of rawhide strips, there is disposed a casing formed by a wrapping of strong canvas F, which is surrounded by the outer layer of rubber G of the tire.

It will be understood that the wrappings of rawhide are coated with crude rubber before being applied and that during the process of vulcanization, these coatings of rubber merge one with the other and thus produce a structure in which the various strips of rawhide are susceptible of slight movement with respect to each other while being positively connected by the intervening rubber tending to prevent their separation should a tack or similar sharp article engage their meeting edges. Such introduction of an article of this sort, however, is further prevented by the fact that the outer layer of rawhide strips extends at an angle to the inner layer and thus the exposed unions of the strips are reduced to a minimum. By reason of the coating of rubber on the rawhide strips, and the fact that they are thus susceptible of slight movement in respect to each other, the tire is given great flexibility and the traction obtained thereby greatly increased.

What is claimed is:

A pneumatic tire including an inner air chamber of rubber, a surrounding layer of canvas stripping extending spirally around the rubber air chamber, a surrounding layer of cotton stripping extending spirally around the canvas stripping in a direction opposite thereto, a surrounding layer of parallel rawhide strips extending spirally around the cotton stripping in a direction opposite thereto, said parallel rawhide strips being individually coated with rubber merged to form an enveloping film upon the strips, a surrounding layer of oppositely disposed parallel spirally wound rawhide strips disposed upon the first layer of rawhide strips, the second layer of rawhide strips being individually coated with rubber merged to form a rubber envelop for the strips, a surrounding layer of spirally wound canvas stripping disposed upon the outer layer of rawhide strips, and a surrounding cover of rubber disposed upon the last named canvas stripping.

In testimony whereof I affix my signature, in presence of two witnesses.

BAILEY BRADLEY DAWSON.

Witnesses:
L. W. HEADLEY,
M. A. HEADLEY.